US012798116B2

(12) United States Patent
Nahum et al.

(10) Patent No.: US 12,798,116 B2
(45) Date of Patent: Nov. 17, 2026

(54) HIGH RESOLUTION ROBOTIC FINGERS

(71) Applicant: Ramot at Tel-Aviv University Ltd., Tel Aviv (IL)

(72) Inventors: Noam Nahum, Tel Aviv (IL); Avishai Sintov, Tel Aviv (IL)

(73) Assignee: RAMOT AT TEL-AVIV UNIVERSITY LTD, Tel Aviv (IL)

( * ) Notice: Subject to any disclaimer, the term of this patent is extended or adjusted under 35 U.S.C. 154(b) by 582 days.

(21) Appl. No.: 18/557,068

(22) PCT Filed: Apr. 25, 2022

(86) PCT No.: PCT/IL2022/050421

§ 371 (c)(1),
(2) Date: Oct. 25, 2023

(87) PCT Pub. No.: WO2022/229950

PCT Pub. Date: Nov. 3, 2022

(65) Prior Publication Data

US 2024/0217116 A1 Jul. 4, 2024

Related U.S. Application Data

(60) Provisional application No. 63/179,419, filed on Apr. 25, 2021.

(51) Int. Cl.
*B25J 15/00* (2006.01)

(52) U.S. Cl.
CPC ....... *B25J 15/0009* (2013.01); *B25J 15/0004* (2013.01)

(58) Field of Classification Search
CPC ................ B25J 15/0009; B25J 15/0004; B25J 15/0028; B25J 15/0033; B25J 15/0038; B25J 15/0213; B06B 1/16; B06B 3/00
USPC .......................................................... 294/192
See application file for complete search history.

(56) References Cited

U.S. PATENT DOCUMENTS

2021/0213479 A1 7/2021 Grass
2021/0364478 A1* 11/2021 Cha ........................ B25J 19/028

FOREIGN PATENT DOCUMENTS

CN 208305076 U * 1/2019
FR 3086195 A1 3/2020

OTHER PUBLICATIONS

CN_208305076_U_translate Relevant prior art (Year: 2019).*
Search Report and Written Opinion dated Sep. 22, 2022 for PCT Application PCT/IL2022/050421 filed Apr. 25, 2022.

(Continued)

*Primary Examiner* — Robert W Hodge
*Assistant Examiner* — Rehman A Qureshi
(74) *Attorney, Agent, or Firm* — A.C. Entis-IP Ltd; Allan C. Entis

(57) ABSTRACT

A robotic finger comprising: a vibrator for vibrating in vibratory motion cycles; a contact pad in communication with the vibrator for frictionally contacting an object at a surface contact region of the object, wherein the vibratory motion motion of the vibrator generates vibratory motion in the contact pad back and forth along an axis of vibration and a net displacement of the object along a selected direction along the axis of vibration; and a transmission system in communication with the vibrator for rotating the vibrator and the vibration axis to a desired azimuth angle.

16 Claims, 5 Drawing Sheets

(56) References Cited

OTHER PUBLICATIONS

Supplementary European Search dated Jul. 9, 2024 for European Application 22795139.9. filed Nov. 2, 2023.
Office Action dated Jul. 19, 2024 for European Application 22795139.9. filed Nov. 2, 2023.

* cited by examiner

HIGH RESOLUTION ROBOTIC FINGERS

RELATED APPLICATIONS

The present application is a U.S. National Phase of PCT/IL2022/050421 filed on Apr. 25, 2022, which claims the benefit under 35 U.S.C. 119(e) of U.S. Provisional Application 63/179,419 filed on Apr. 25, 2021, the disclosures of which are incorporated herein by reference.

FIELD

Embodiments of the disclosure relate to robotic fingers and hands.

BACKGROUND

Robots and robotic assistants configured to replace and/or assist humans are proliferating and engage in an ever expanding variety of applications from relatively simple pick and place tasks, serving coffee in paper cups, to carrying out surgeries on the human body. Almost invariably the tasks involve gripping, moving, and often using different types of objects that the human hand under control of hand-eye coordination and haptic feedback carries out gracefully with seemingly little effort.

Providing robotic fingers and hands with a semblance of the natural abilities of the human hand is a challenging task of intricate complexity.

SUMMARY

An aspect of an embodiment of the disclosure relates to providing an artificial or robotic finger for touching and holding an object and applying force substantially parallel to a contact surface region of the object to manipulate the object with relatively high spatial accuracy.

In an embodiment, the artificial finger, hereinafter also referred to as an "Accu-Finger", comprises a distal phalange housing a vibrator coupled to a contact pad configured to make frictional contact with the surface contact region at an extreme end of the phalange. The vibrator is excitable to generate vibratory motion along a vibration axis that is optionally fixed relative to the structure of the vibrator and is substantially perpendicular to an axis of the vibrator. In an embodiment the vibrator comprises an eccentric rotating mass (ERM) motor and the vibration axis is substantially parallel to a plane of rotation of the eccentric mass and passes through a center of rotation of the eccentric mass. During a first half, also referred to as a first phase, of each cycle of the vibratory motion the vibrator or a portion thereof moves in a first direction along the vibration axis. During a second half, also referred to as a second phase of the cycle, the vibrator or portion thereof moves in an opposite direction along the vibration axis. The excited vibrations of the vibrator induce corresponding vibrations of the contact pad substantially along the same vibration axis along which the vibrator vibrates.

When the contact pad is pressed to the contact surface region of the object and the vibrator excited to vibrate, during the first phase of each vibration cycle frictional force between the contact pad and the surface region substantially sticks and holds the contact pad to the contact surface region and the contact pad applies force to the contact surface region that operates to accelerate and/or move the object in the first direction along the vibration axis. During the second phase of the vibration cycle, frictional force between the contact pad and the surface region decreases, the contact pad slips along the contact surface, and force applied to the contact surface region is less than during the first phase of the vibration cycle. As a result, the vibration cycle operates to generate a net translation of the contact surface region of the object in the first direction along the vibration axis. For convenience of presentation, the first phase of the vibratory motion of the contact pad in which the contact pad sticks to the contact surface of the object may be referred as a sticking phase. The second phase may be referred to as a slipping phase.

In an embodiment, the vibrator is connected to a transmission system operable to rotate the vibrator and thereby the vibration axis along which the vibrator and contact pad execute vibratory motion, to a desired azimuth angle about the vibrator axis. The transmission system may comprise a shaft connected to the vibrator and to a transmission motor and has a transmission axis that is optionally substantially coincident with the vibrator axis. The transmission motor is controllable to rotate the shaft to a desired azimuth angle about the vibrator axis and thereby to orient the vibrator and axis of vibration in an azimuthal direction along which it is desired to have the contact pad apply force to and move the object. In an embodiment, the distal phalange is coupled to a medial phalange that houses the transmission motor.

In an embodiment, at least one Accu-Finger is coupled to an opposing finger to form a gripper, also referred to as an Accu-Gripper, operable to grip an object between the Accu-Finger and the opposing finger and control the at least one Accu-finger to manipulate the gripped object. Optionally, the opposing finger is an Accu-Finger.

In an embodiment, a plurality of Accu-Fingers are coupled to an opposable thumb to provide a robotic hand, also referred to as an Accu-Hand, that mimics human hand motion to grasp and manipulate an object. Optionally, the opposable thumb is an Accu-Finger.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure may be labeled with a same label in multiple figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1:
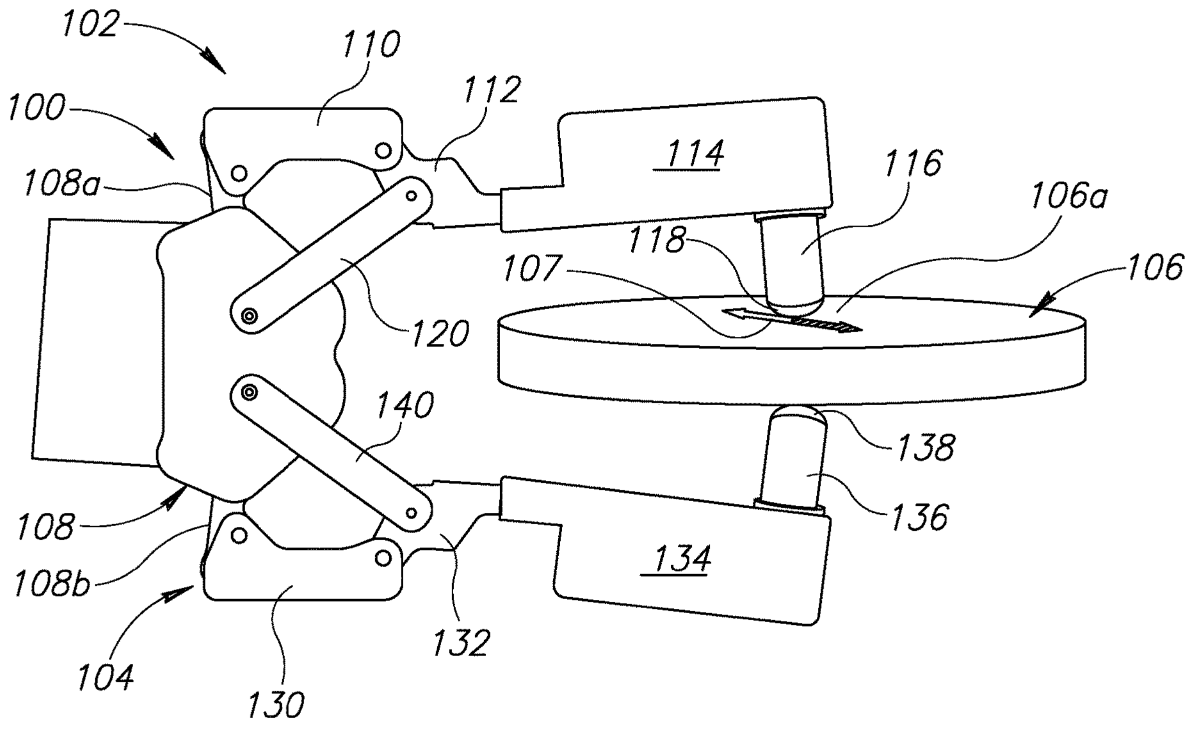
FIG. 1 schematically shows an Accu-Gripper comprising at least one Accu-Finger gripping a disk and operable to translate the disk, in accordance with an embodiment of the disclosure.

FIG. 1 schematically shows an Accu-Gripper 100, having a Accu-Finger 102, and a supporting finger 104, hereinafter also referred to as an opposable finger 104, oppositely disposed to the Accu-Finger 102. Accu-finger 102 and opposable finger 104, are shown by way of example, as gripping a disk 106. Both Accu-Finger 102 and support finger 104 are movably connected to a palm 108, to allow fingers 102 and 104 to be moved toward each other to grip disk 106 and away from each other to release the disk. Palm 108 comprises any configuration of linkages, actuators and/or motors controllable to move Accu-Finger 102 and opposable finger 104 to grip or release disk 106.

Accu-Finger 102, for example, includes three sections, a proximal phalange (phalanx) 110, in communication with an intermediate phalange 112, in communication with a distal phalange 114. These three phalange sections 110, 112, 114, may mimic the phalanges which form human fingers.

Distal phalange 114 includes a protrusion 116, which terminates at a contact pad 118. Contact pad 118 is configured to make frictional contact with articles, for example, with a surface contact region **106*a* of disk 106. Accu-finger 102, is operable to generate vibrations in contact pad 118 that apply force to disk 106, parallel to surface 106*a* of the disk to displace the disk optionally in a direction indicated by a shaded region of an axis of vibration indicated by a double headed arrow 107**.

The shaded region points in a direction in which contact pad 118 moves during the sticking phase of the vibratory motion of contact pad 118. The unshaded region points in a direction in which the contact pad moves during the slipping phase of the vibratory motion. During the sticking phase, motion of contact pad 118 operates to displace disk 106 in the direction of shaded region of vibration axis 107. During the slipping phase of the vibratory motion contact pad 118 applies a smaller normal force to disk 106 than during the sticking phase and slips along the surface of the disk. As a result, the vibratory motion generally moves disk 106 in the direction of the shaded portion of the vibration axis. The control of the direction along the vibration axis 107 towards the shaded region is further elaborated below.

In an embodiment, proximal phalange 110 is rotatably mounted to a member **108*a* extending from palm 108 and to intermediate phalange 112. Intermediate phalange 112 connects to distal phalange 114. Intermediate phalange 112 is rotatably connected to an arm 120, at one end thereof. The other end of arm 120** is rotatably connected to the palm.

Opposable finger 104, for example, is optionally similar to Accu-Finger 102 and includes three sections, a proximal phalange 130, in communication with an intermediate phalange 132, which in turn communicates with a distal phalange 134. The distal phalange includes a protrusion 136, which terminates in a contact pad 138. Contact pad 138 is configured to make contact with an object, for example, disk 106, at a location opposite to that of a location at which contact pad 118 contacts the object when Accu-Finger 102 and opposable finger 104 are moved toward each other to grip the object.

For example, for opposable finger 104, proximal phalange 130 is rotatably mounted to member **108*b* extending from palm 108 and to intermediate phalange 132. Intermediate phalange 132 connects to distal phalange 134 and is rotatably connected to an arm 140 at one end thereof. The other end of arm 140 is rotatably connected to the palm. The linkages, actuators and/or motors of the palm may move member 108*b* and arm 140, allowing for inward and outward movement of opposable finger 104. The linkages, actuators and/or motors controllable to move Accu-finger 102 and opposable finger 104** may operate independently of each other, or in a cooperative manner.

Figure 2A:
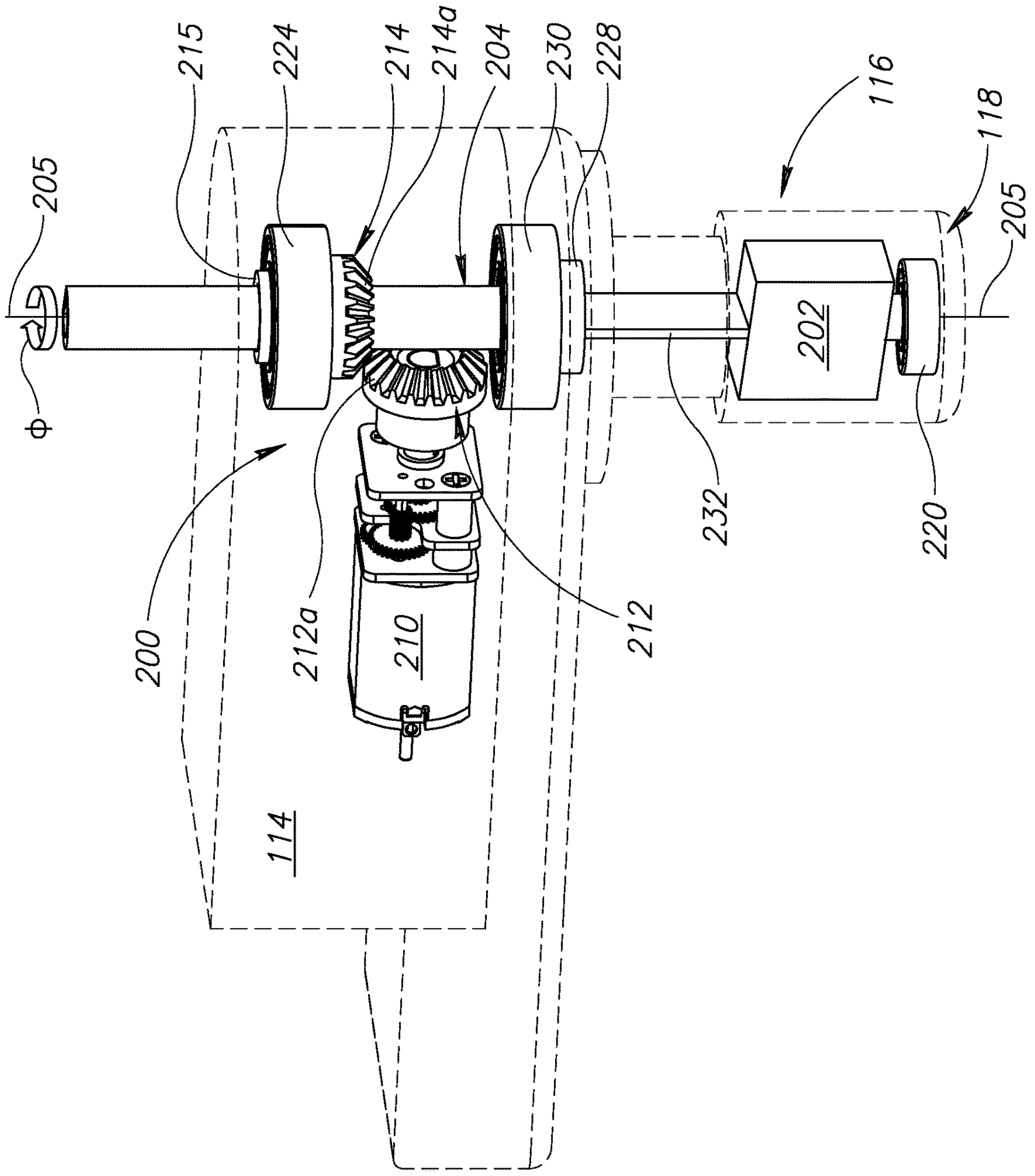
FIG. 2A schematically shows an Accu-Finger comprised in the Accu-Gripper shown in FIG. 1 and internal components of the Accu-Finger, in accordance with an embodiment of the disclosure.

FIG. 2A schematically shows a schematic see-thru view of distal phalange 114 to display internal components of the distal phalange in accordance with an embodiment of the disclosure. Phalange 114 houses a transmission system 200 that couples to a vibrator 202 via a shaft 204, having an axis 205 which is a transmission axis of transmission system 200 and an axis of vibrator 202. Transmission system 200 is operable to rotate vibrator 202 to a selected azimuth angle (@) about axis 205, in accordance with an embodiment of the disclosure. When controlled to vibrate, vibrator 202 vibrates and generates vibratory motion of contact pad 118 back and forth along axis of vibration 107 (FIG. 1). Vibration axis 107 is oriented to the selected azimuth angle to which transmission system 200 rotates vibrator 202 about axis 205.

Transmission system 200 includes a motor 210, coupled to a to rotate first bevel gear 212, which intermeshes with a second bevel gear 214. First and second bevel gears 214, 216 intermesh to transfer rotational motion from first bevel gear 212 to second bevel gear 214. Second bevel gear 214 couples to shaft 204, which in turn, is coupled to vibrator 202. Motor 210 is controllable to rotate first bevel gear 212 and thereby second bevel gear 214 and vibrator 202 about axis 205 selectively clockwise or counterclockwise.

Figure 2D:
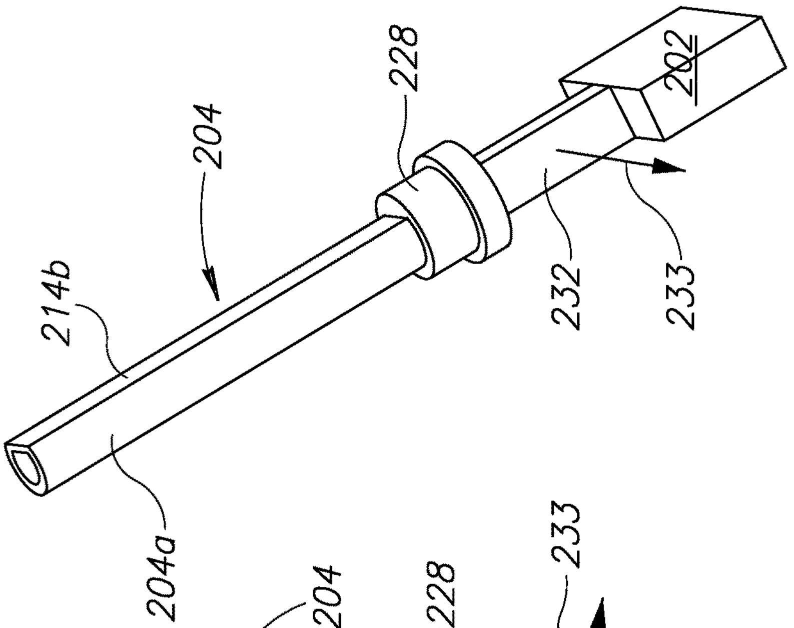
FIG. 2B-FIG. 2D schematically show internal components of the Accu-Finger shown in FIG. 2A enlarged exhibit details of the components, in accordance with an embodiment of the disclosure.

Motor 210, may for example, be a standard motor, which drives bevel gear 212. Teeth **212*a* of the motor driven bevel gear 212, engage and intermesh with a corresponding teeth 214*a* of bevel gear 214, allowing for the transfer of rotational motion from motor driven bevel gear 212 to bevel gear 214. Bevel gear 214 attaches to a collar 215. The collar seats in a rotatable manner in a bearing 224. Shaft 204 is attached to collar 215, and extends through bevel gear 214, collar 215, and bearing 224. Shaft 204 is, may for example, have a D-shaped cross section, formed, for example of a rounded portion 204*a* and a flat 204*b*, as shown in FIG. 2D. Flat 204*b* serves to lock bevel gear 214*a* to shaft 204**.

Figure 2C:
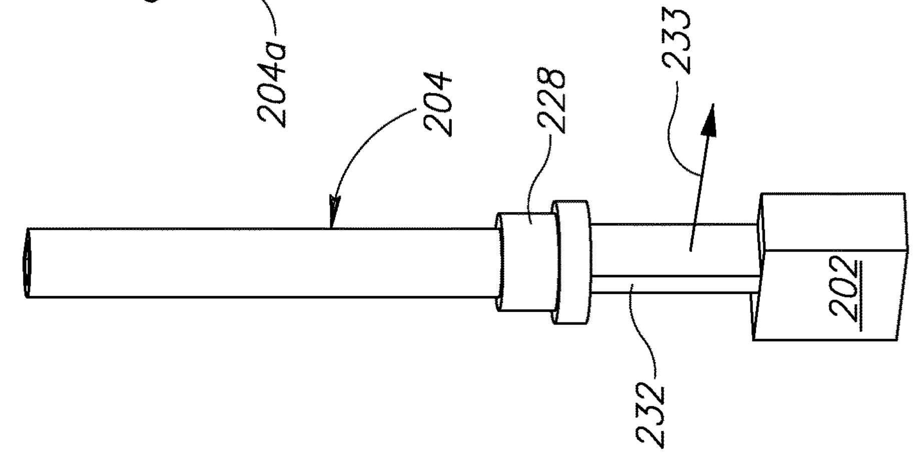
Figure 2B:
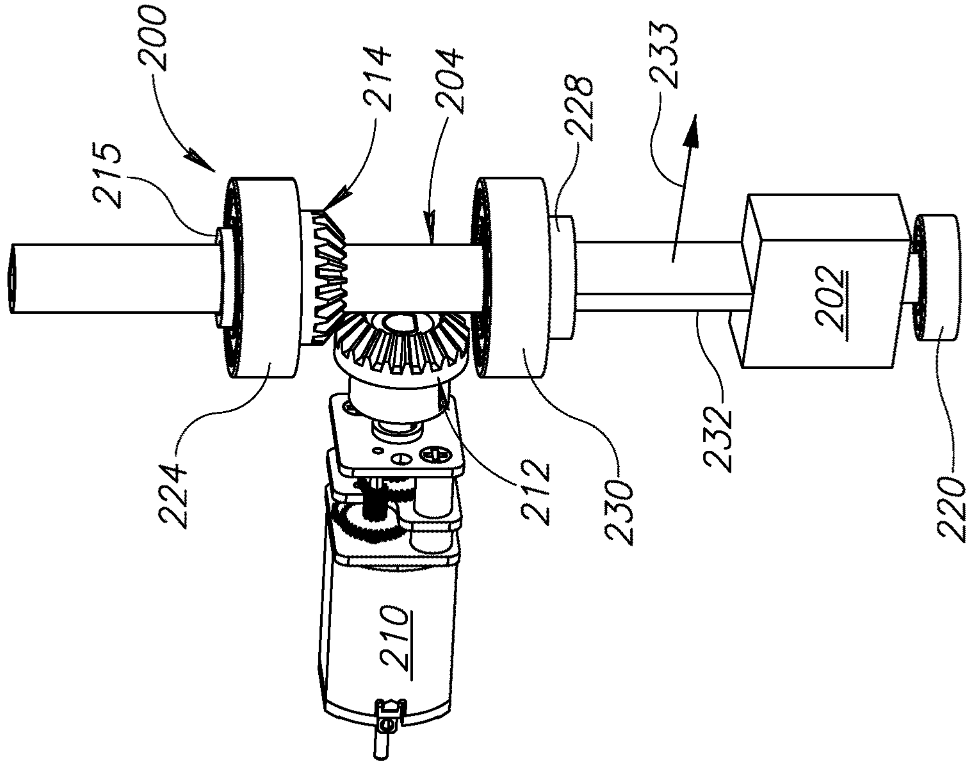

As also shown in FIG. 2B and FIG. 2C, a stop collar 228 receives shaft 204. Shaft 204 and stop collar 228 seat in and rotate together in a second bearing 230. Stop collar 228 includes a portion of larger diameter than the opening of second bearing 230 (through which shaft 204 and stop collar 228 extend) to prevent shaft 204 from moving axially in one direction. An optionally planar beam 232 having a normal "233" attaches stop collar 228 to vibrator 202. Normal 233 may be substantially parallel to vibration axis 107.

In an example operation of the Accu-Gripper 100, as shown, for example in FIG. 1, object 106 is initially held between Accu-Finger 102 and opposable finger 104. Opposable finger 104 supports object 106 against Accu-Finger 102, with contact pad 138 of opposable finger 104 advantageously substantially frictionless or characterized by substantially reduced friction. As noted above vibrator 202 is operable to vibrate in cycles, each cycle, including a first "forward" sticking phase and a second "rearward" slipping phase, along vibration axis 107 to move disk 106 in a forward direction indicated by of the shaded portion of arrow 107 shown in FIG. 1.

For example, when contact pad 118 of Accu-Finger 102, is pressed to contact surface region 106*a* of object 106, and vibrator 202 is excited to vibrate, during the first sticking phase of each vibration cycle, static frictional force between contact pad 118 and contact surface region 106*a* of object 106 sticks and locks contact pad 118 to contact surface region 106*a*. Contact pad 118 applies force to the contact surface region 106*a*, which operates to move and displace the disk in the forward direction indicated by shaded region of vibration axis 107. During the second phase of the vibration cycle, when motion of the contact pad is in the direction indicated by the unshaded region of vibration axis 107, frictional force between contact pad 118 and the surface region decreases, from static friction to sliding friction and contact pad 118 slips along the contact surface region 106*a*. As a result, whereas during slippage the contact pad may move disk 106 in the rearward direction indicated by the unshaded portion of vibration axis 107, displacement in the rearward direction is less than displacement in the forward direction. The slippage therefore results in a net displacement of disk 106 for the vibration cycle in the forward direction.

Figure 3B:
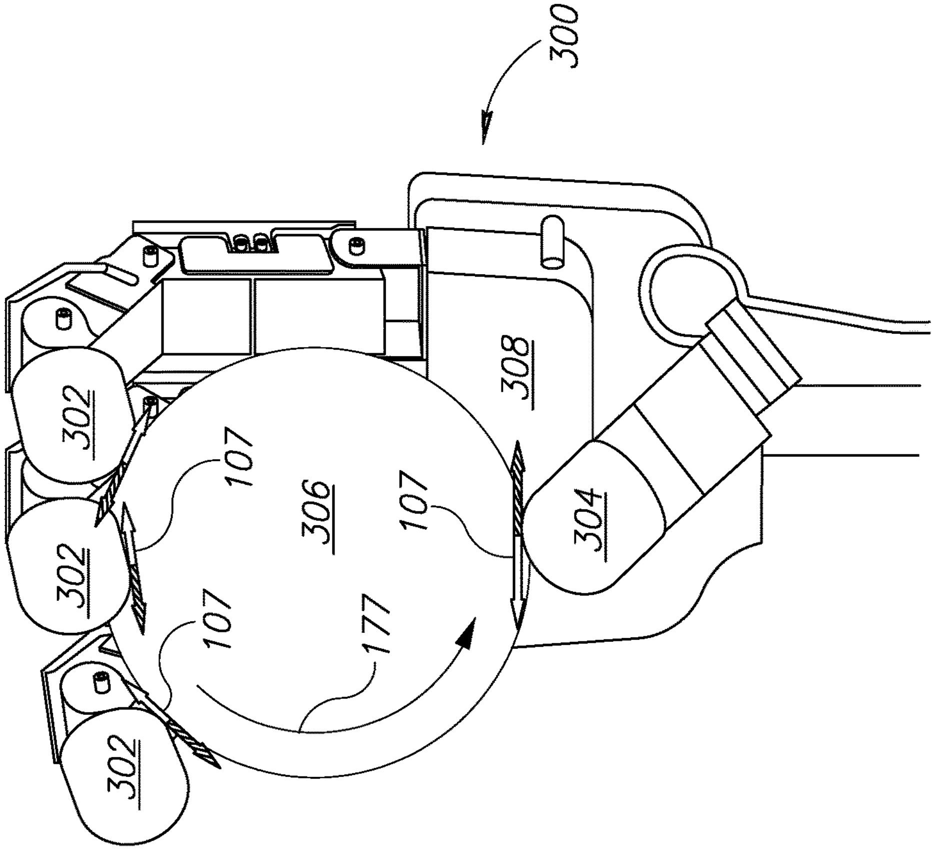
FIG. 3B schematically shows the robotic hand shown in FIG. 3A holding a ball, in accordance with an embodiment of the disclosure.
Figure 3A:
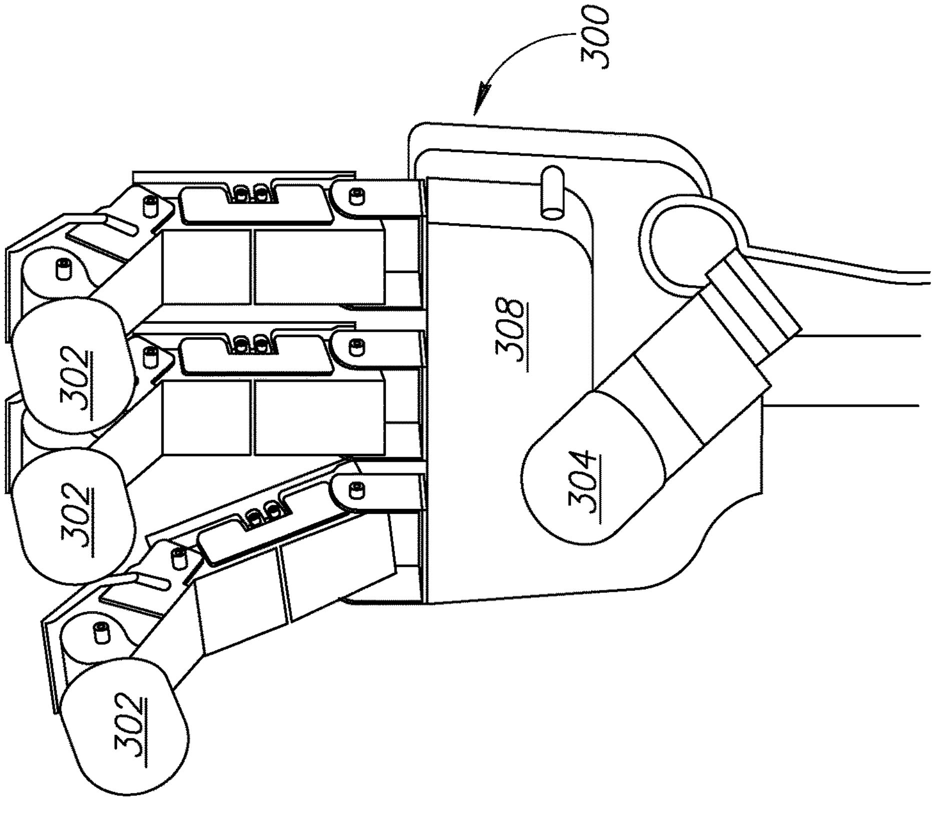
FIG. 3A schematically shows a robotic hand comprising Accu-Fingers, in accordance with an embodiment of the disclosure.

Attention is directed to FIG. 3A and FIG. 3B, which schematically show a robotic hand 300, also known as Accu-Hand, formed of multiple Accu-Fingers 302, and an opposable thumb 304, in accordance with an embodiment of the disclosure. Accu-Fingers 302 are, by way of example, in accordance with the Accu-Finger 102 shown in FIG. 1 and FIG. 2A—FIG. 2D and described above. Opposable thumb 304 may for example, be equipped with a vibrator and operable similarly to Accu-Finger 102 as described above. Optionally, opposable thumb 304 does not comprise a vibrator and operates only to oppose Accu-Fingers 302 to enable Accu-Hand 300 to grasp an object.

FIG. 3B, schematically shows Accu-Hand 300 holding a ball 306, between Accu-Fingers 302 and opposable thumb 304. The movement of the Accu-Fingers 302 and the opposable thumb, with respect to each other are, for example, controlled by a motor (not shown) and controller (not shown) in a palm 308, from which the Accu-Fingers 302 and opposable thumb 304 extend. Vibrators 202 in each of the Accu-fingers 302, as well as that of opposable thumb 304 may be operable independently of each other. Additionally, each of Accu-Fingers 302 and opposable thumb 304 have their respective vibrators 202 (FIG. 2A-2D) rotated to various azimuth angles to generate vibrations along different corresponding vibration axes 107. This allows for various desired movements of ball 306. By way of example, in FIG. 3B vibration axes 107 respectively associated with Accu-Fingers 302 and opposable thumb 304 are oriented so that vibrations of contact pads of the fingers and thumbs rotate ball 306 counterclockwise as indicated by curved arrow 177. This counterclockwise movement occurs as the vibrations from the respective vibrators 102 result in displacement of the object 306 in the direction of the shaded portions of the vibration axes 107.

While Accu-Fingers 114 and 302 are shown and described as having three phalanges, an Accu-finger in accordance with an embodiment of the disclosure is not limited to having a plurality of three phalanges. An Accu-Finger may have any number of phalanges and/or mechanical structures for supporting and moving a distal phalange to contact and move an object as desired. The term Accu-Finger may be used to refer only to a distal phalange comprising a vibrator coupled to a contact pad at an extreme end of the phalange for frictionally contacting an object and having a portion of a transmission system for rotating the vibrator.

Vibrator 202 schematically shown in FIGS. 2A-2D may include one or more piezo-electric actuators which apply forces along the vibration axis 107 and normal to it so as to switch between a sticking phase and a slipping phase and to move the object in a desired direction as detailed above.

Figure 4:
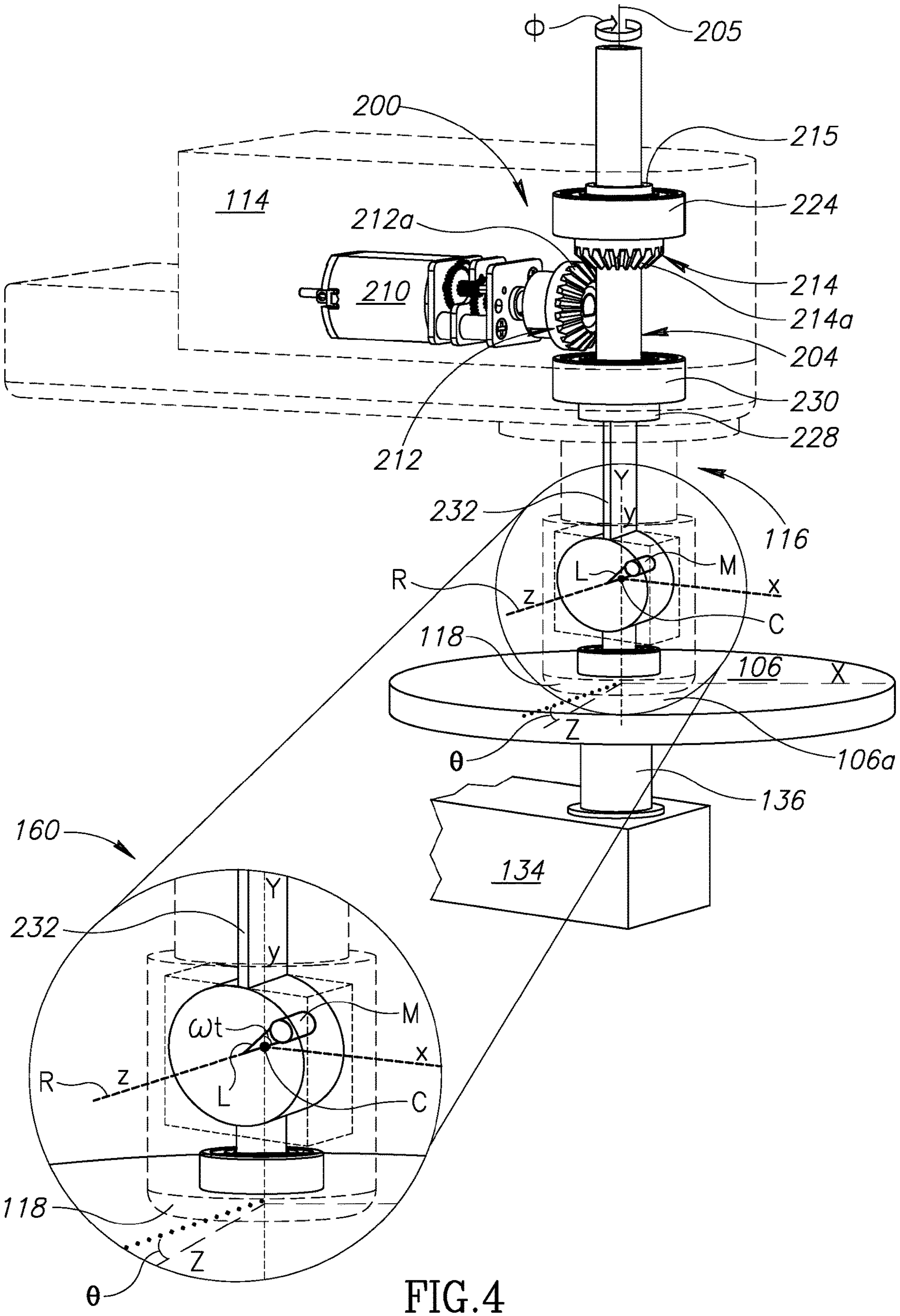
FIG. 4 schematically shows the Accu-Finger shown in FIG. 2A in which the vibrator comprises an ERM motor, in accordance with an embodiment of the disclosure.

In an embodiment, as schematically depicted in FIG. 4 vibrator 202 comprised in distal phalange 114 of finger Accu-Finger 102 shown in FIG. 2A includes a rotating mass (ERM) motor 400 which operates to switch between a sticking phase and a slipping phase to move an object, such as disk 106, in a desired direction as discussed above. Motor 400 optionally has a housing 402 comprising an eccentric mass M located at a distance L from an axis and center of rotation R and C respectively of the motor about which ERM motor 400 is excited to rotate mass M. For convenience of discussion, features of motor 400 are referenced to an XYZ Cartesian coordinate system having a Y-axis coincident with transmission axis 205 of distal phalange 114. Features of ERM motor 400 are referenced to an xyz coordinate system having a y-axis coincident with the Y-axis and a z-axis coincident with axis of rotation R of ERM motor 400. Features of ERM motor 400 are shown enlarged in and inset 460.

Let an angle θ represent angular displacement of rotation axis R from the X-axis, where a counterclockwise angular displacement as seen from a positive z coordinate, is a positive displacement. In FIG. 4 axis of rotation R is displaced by a negative angle θ. Angular displacement θ is the azimuth angle of vibration axis 107 relative to the X-axis of coordinate system 450. If motor 400 is excited to rotate mass M about R at an angular velocity @, (inset 460) mass M exerts a time dependent centrifugal force having x and y components:

$$f_x(t) = ML\omega^2\cos\omega t; \quad (1$$

and $$f_y(t) = ML\omega^2\sin\omega t. \quad (2$$

Assume that when motor ERM 400 is not excited to rotate mass M and the y-axis is perpendicular to gravity, that is when the mass M does not contribute to force with which contact pads 118 and 138 clamp disc 106, the contact pads clamp disc 106 with a clamping force $f_C$. Then, assuming that ŷ is normal to surface contact region 106*a* then motor M is excited to rotate mass M, contact pad 118 exerts a time dependent clamping force $F_C(t)\hat{y}$ in the ŷ direction which is normal to surface contact region 106*a* of disc 106 that may be given by an expression:

$$F_c(t)\hat{y} = \left(-f_c + f_y(t) - M(\vec{g}\cdot\hat{y})\right)\hat{y} = \left(-f_c + ML\omega^2\sin\omega t - M(\vec{g}\cdot\hat{y})\right)\hat{y} = f_b + ML\omega^2\sin\omega t, \quad (3$$

where $$f_b = -(f_c + Mg\cdot\hat{y}) \text{ and } \vec{g} \text{ is the gravity vector.} \quad (4$$

And ERM motor 400 exerts a time dependent accelerating force $F_a(t)\hat{x}$ in the x̂ direction, parallel to surface contact region 106*a* that may be given by an expression, $$F_a(t)\hat{x} = f_x(t) = \Gamma\left(ML\omega^2\cos\omega t\right), \quad (5$$

where Γ is a mapping function that accounts for the structural configurations of Accu-Fingers 102 and 104 and materials from which the Accu-Fingers are made in mapping force $ML\omega^2 \cos \omega t$ to $F_a(t)\hat{x}$.

$F_a(t)\hat{x}$ defines a time dependent force vector $F_A(t)$ in coordinate system XYZ having components $F_A(t)\hat{X}$ and $F_A(t)\hat{Z}$ that Accu-Finger 114 applies to disc 106. The components may be written, $$F_A(t)\hat{X} = \Gamma(F_a(t)\sin\theta)\hat{X} = \Gamma\left[\left(ML\omega^2\cos\omega t\right)\sin\theta\right]\hat{X}, \quad (6$$

$$F_A(t)\hat{Z} = \Gamma[(F_a(t)\cos\theta]\hat{Z} = \Gamma\left[\left(ML\omega^2\cos\omega t\right)\cos\theta\right]\hat{Z}. \quad (7$$

And if a center of mass, "com", of mass disc 106 has a position at time t given by a position vector Pcom(t) with respect to coordinate system XYZ, force $F_A(t)$ exerts a time dependent torque τ(t) on disc 106 that may be give by an expression, $$\tau(t) = Pcom(t)\times\Gamma(F_A(t)) \quad (8$$

where x indicates the cross product.

During a sticking phase $F_A(t)$ and clamping force $F_C(t)\hat{y}$ are related by an expression, $$|F_A(t)| \le \mu_s F_C(t), \quad (9$$

where $\mu_s$ is a coefficient of static friction and equations 6) and 7) are forces that determine linear acceleration of the com of disc 106, and equation 8) is a torque that determines time rate of change in angular momentum of disc 106.

During a slipping phase $F_A(t)$ and clamping force $F_C(t)\hat{y}$ are related by an expression, $$|F_A(t)| > \mu_s F_C(t). \quad (9$$

Components of forces $F_A(t)$ that determine acceleration of the com of disc 106 become $$F_A(t)\hat{X} = \Gamma[(F_a(t) - \mu_k F_C(t))\sin\theta]\hat{X} \quad (10$$

and $$F_A(t)\hat{Z} = \Gamma[(F_a(t) - \mu_k F_C(t))\cos\theta]\hat{Z}, \quad (11$$

where $\mu_k$ is kinetic friction. Torque that determines time rate of change in angular momentum of disc 106 during the slipping phase becomes, $$\tau(t) = Pcom(t)\times\Gamma(F_A(t)) \quad (12$$

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A robotic finger comprising:

a vibrator for vibrating in vibratory motion cycles;

a contact pad in communication with the vibrator for frictionally contacting an object at a surface contact region of the object, wherein the vibratory motion of the vibrator generates vibratory motion in the contact pad back and forth along an axis of vibration and a net displacement of the object along a selected direction along the axis of vibration; and a transmission system in communication with the vibrator for rotating the vibrator and the vibration axis to a desired azimuth angle.

2. The robotic finger of claim 1 comprising a distal phalangeal portion.

3. The robotic finger of claim 1 and comprising, a proximal phalangeal portion, and an intermediate phalangeal portion in communication with the proximal phalangeal portion and the distal phalangeal portion.

4. The robotic finger of claim 2 wherein the transmission system is at least partially housed in the distal phalangeal portion.

5. The robotic finger of claim 4, wherein the vibrator, is housed in the distal phalangeal portion.

6. The robotic finger of claim 1, wherein the transmission system includes:

a motor;

first and second intermeshed bevel gears, the first bevel gear in communication with the motor for rotating the second bevel gear; and, a shaft rotatably coupled to the second bevel gear, the shaft in communication with the vibrator, such that rotation of the shaft rotates the vibrator to the azimuth angle.

7. The robotic finger of claim 6 wherein the shaft has an axis of rotation substantially perpendicular to the vibration axis.

8. The robotic finger of claim 6, additionally comprising:

a stop collar for receiving the shaft; and, a beam in communication with the stop collar and the vibrator.

9. The robotic finger of claim 8, wherein the stop collar is rotatably received by a bearing.

10. The robotic finger of claim 1 wherein the vibrator comprises an eccentric rotating mass (ERM) motor.

11. The robotic finger of claim 10 wherein when excited the ERM motor rotates the mass in a plane substantially parallel to the axis of vibration.

12. The robotic finger of claim 10 wherein the direction of rotating the ERM determines a direction along the vibration axis in which the object exhibits the net is displacement.

13. The robotic finger of claim 10 wherein the direction of rotating the ERM controls friction between the contact pad and the object.

14. The robotic finger of claim 10 wherein the rotating frequency of the ERM determines magnitude of a force with which the contact pad contacts the contact surface region of the object.

15. A robotic hand comprising:

a palm in communication with a first robotic finger and at least one second robotic fingers according to claim 1; and wherein the first robotic finger is operable as an opposable thumb controllable to be positioned to oppose the at least one second robotic fingers.

16. The robotic hand of claim 15, wherein the at least one second robotic finger comprises a plurality of second robotic fingers.

* * * * *